United States Patent Office 3,491,712
Patented Jan. 27, 1970

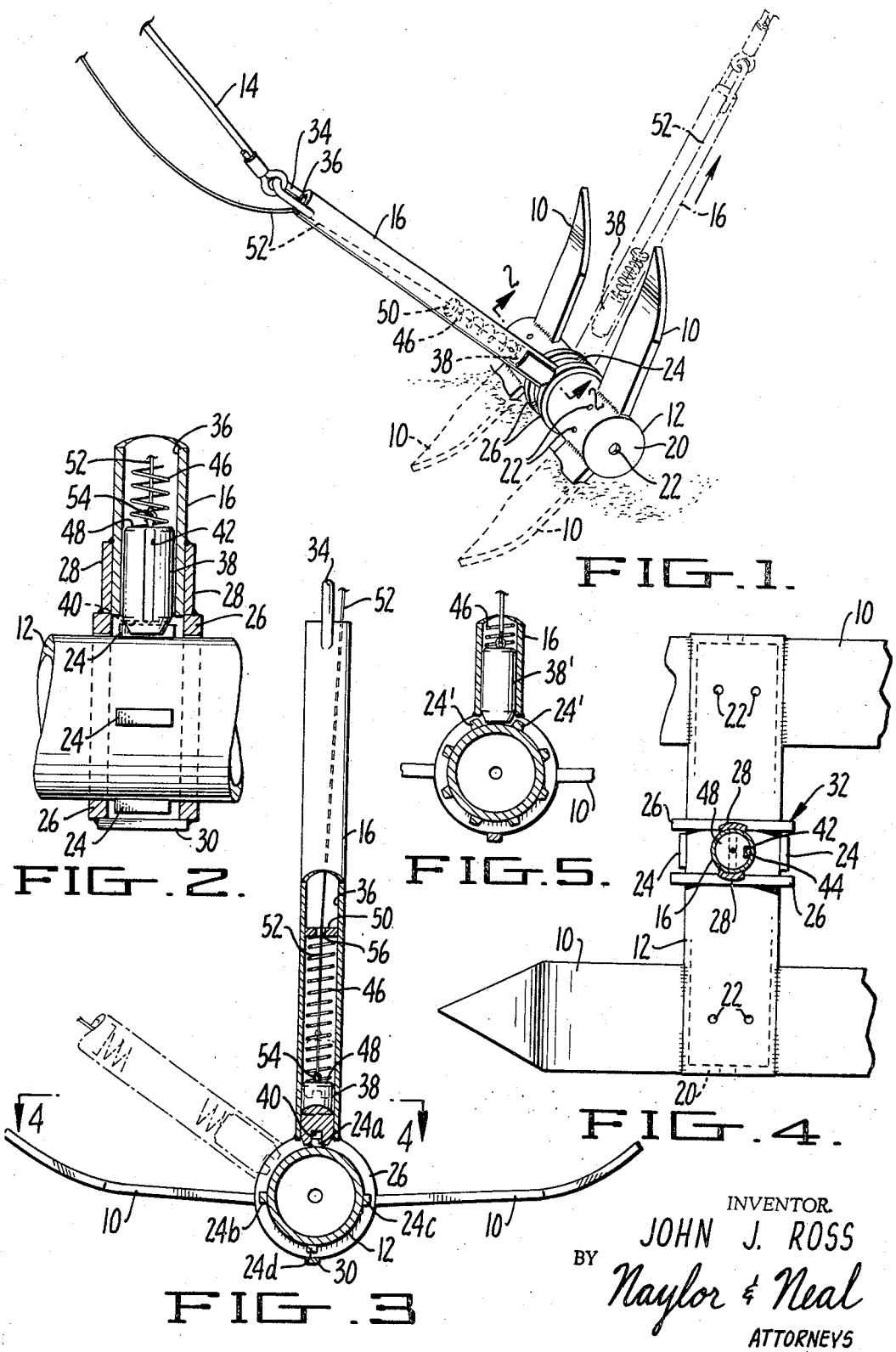

3,491,712
SELF-RELEASING ANCHOR
John J. Ross, P.O. Box 1922, Redding, Calif. 96001
Filed Aug. 22, 1968, Ser. No. 754,574
Int. Cl. B63b 21/34
U.S. Cl. 114—208
5 Claims

ABSTRACT OF THE DISCLOSURE

An anchor comprising a pair of diametrically mounted flukes fixed adjacent to each end of a fluke shaft, a series of centrally located protruding stop keys around the outer periphery of the shaft and an anchor shank pivotally connected to the fluke shaft by a yoke-like collar bracketing the stop keys. A spring biased detent pin is slidably received in the shank for selective engagement with the stop keys to lock the anchor shank in relation to the fluke shaft and a release line is connected to the end of the detent pin for retracting the detent pin from engagement with the stop keys to permit the anchor shank to freely rotate about the fluke shaft.

BACKGROUND OF THE INVENTION

Anchors having releasable flukes are relatively old in the art. However, anchors embodying this desirable feature have heretofore had certain drawbacks. They have been customarily expensive to manufacture and have contained releases that often have a tendency to jam.

Primarily, releasable fluke anchors are of two basic design types, those in which the flukes are released upon exertion of a set force on the anchor line and those in which the flukes are released upon pulling an independent release line, supplemental to the anchor line. The improvements in the invented anchor relate primarily to the latter type, although certain features may be advantageously employed in the former type. The latter type has the distinct advantage of remaining in anchored position regardless of the tension on the main anchor line. The basic design of this type of releasable anchor incorporates a spring loaded detent pin which is inserted into a slot or opening in a transverse shaft or sleeve on which are fixed the flukes. In addition to weakening the structural strength of the shaft, the inserted detent pin has a tendency to jam in place if any lateral forces in the direction of the transverse shaft or sleeve are exerted on the flukes relative to the pin. Such forces are common if the ship or other anchored device has altered position after initial anchoring.

SUMMARY OF THE INVENTION

The heavy duty anchor of the invention incorporates several desirable and novel features inherent in its design. As a basic feature, the anchor comprises a plurality of projecting flukes transversely fixed to an elongated cylindrical shaft. At the center of the fluke shaft are fixed a plurality of protruding stop keys. The keys are uniformly spaced around the circumference of the fluke shaft and extend longitudinally relative to its axis. Adjacent to each of the ends of the stop keys is placed an annular ring which is free to rotate about the cylindrical fluke shaft. The two rings are connected to the end of a tubular shank which is mounted perpendicular to the axis of the fluke shaft and are of such thickness as to protrude above the the plurality of stop keys. Relative lateral movement between the rings and the fluke shaft is prevented by the interposition of the stop keys between the rings. The collar and tubular sank, however, may freely pivot about the cylindrical fluke shaft.

Inserted into the barrel of the tubular shank is a spring biased detent pin which engages the stop keys to lock the shank in relation to the cylindrical fluke shaft. A release line attached to one end of the detent pin retracts the pin from engagement with the stop keys when pulled.

The design of the mechanism to release the flukes is such that lateral forces in the longitudinal direction of the cylindrical fluke shaft will be exerted on and absorbed by the plurality of stop keys and the collar, rather than the detent pin. An important feature of the invented anchor is that the incorporated elements may be wholly fabricated from standard supply materials, principally comprising plate steel and heavy gage tubing.

An additional feature of great benefit is the convenient storage positions in which the anchor may be fixed. For example, in the anchor design employing a notched detent pin, four stop keys may be advantageously positioned on the cylindrical fluke shaft in the following manner. The principal stop key is centrally placed on the fluke shaft between the diametrically protruding flukes for the anchoring position of the shank. In this position the flukes curve slightly upward toward the shank to enhance gripping the anchor with the floor of a water body. A second stop key is placed on the cylindrical shaft directly opposite the principal stop key. When the anchor shank is locked in this position the anchor will stably seat on the ground or boat dock with the shank in an upright position and the downward curving flukes acting as support legs. Placement of two additional stop keys at opposite locations on the cylindrical shaft each removed 90° from the two aforementioned stop keys will permit the anchor shaft to be locked in alternate positions whereby the anchor may lie flatly on the ground or deck, or may hang against a wall. In such instance the curved flukes may be faced away from an exposed position eliminating any injury hazards. These defined stop positions may also be defined by the select location of stop keys for an alternate design in which the detent pin is not notched. This particular feature for multi-positioning of the shank in relation to the shaft may be advantageously employed in anchor designs other than that herein specifically disclosed. These and other advantages of the improved releasable fluke anchor of the invention will become apparent from a full consideration of the specification and accompanying drawings.

BRIEF DESCRIPTION OF THE DRAWINGS

FIG. 1 is a perspective view of the releasable fluke anchor.

FIG. 2 is an enlarged partial section along the lines 2—2 of FIG. 1.

FIG. 3 is a side elevational view, partially in section of FIG. 1.

FIG. 4 is a sectional view taken on the lines 4—4 of FIG. 3.

FIG. 5 is a sectional view of a portion of a modified embodiment.

DESCRIPTION OF THE PREFERRED EMBODIMENTS

The perspective view in FIG. 1 illustrates the composite anchor. The anchor employs two pairs of diametrically mounted flukes 10 fixed adjacent to opposite ends of an elongated cylindrical fluke shaft 12. The flukes are constructed from a strong spring steel in order to flex, absorbing surges transmitted from an anchor line 14. The flukes 10 are pointed at their ends and slightly curved upward toward an elongated shank 16 when in anchoring position, as shown in FIG. 3. The curvature gives the pointed flukes 10 the best angle for embodiment in the floor of a water body. It is, of course, understood that this angle may alternatively be obtained by angular mounting of straight flukes on the cylindrical shaft 12.

The cylindrical fluke shaft 12 is fabricated from heavy duty tubing or piping. Each end of the shaft 12 is capped by a circular cap 20 of steel plate. Drain holes 22 are drilled at spaced locations in the shaft to eliminate the buoyant effect of a sealed tube. If an extra heavy duty anchor is desired the cylindrical shaft may be formed from a solid bar or solid-filled tubing.

At the center of the cylindrical fluke shaft 12 are fixed a plurality of stop keys 24 as illustrated in FIGS. 3 and 4. Four stop keys 24 are included in the preferred embodiment, and they are uniformly fixed around the circumference of the cylindrical shaft 12, each key 24 having its longitudinal axis parallel with the longitudinal axis of the shaft 12.

An annular ring 26 encircles the cylindrical fluke shaft 12 to each side of and adjacent the ends of the plurality of keys 24 in the manner illustrated in FIGS. 2 and 4. The two rings 26 are interconnected by the elongated anchor shank 16 and two strengthening brackets 28 at the extremity of the shank, as shown in FIGS. 2 and 4. Opposite the end of the shank 16 connected thereto, the outer peripheries of the two annular rings 26 are fixed to a spacer 30 (FIGS. 2 and 3). This gives added strength to the coupling of the rings and functions to maintain them in spaced parallel relationship. The coupled rings 26 form a yoke or collar 32 around the plurality of stop keys 24. The collar 32 and the shank 16 are free to pivot about the cylindrical shaft 12, but are restricted from lateral movement by the plurality of stop keys 24.

The shank 16 is constructed from an elongated section of tubing. At the free end of the shank 16 is fixed a loop 34, suitable for fastening of the anchor line 14 in the manner illustrated in FIG. 1. A detent pin 38 is slidably received in the barrel, designated 36, of the anchor shank 16. The pin 38 is formed with a groove 40 at one end (FIG. 3) which is adapted to engage a single stop key 24 to lock the anchor shank 16 in relation to the flukes 10 at the position desired. To maintain alignment of the groove 40 with the plurality of stop keys 24, a longitudinal slot 42 is machined in the side surface of the detent pin 38 as illustrated in FIGS. 2 and 4. This groove slidably engages a guide pin 44 (FIG. 4) fixed to the barrel 36 of the anchor shank 16.

To maintain the detent pin 38 in locked engagement with an individual stop key 24, a coil spring 46 is received in the barrel 36 of the anchor shank 16 and placed in compression between the top, designated 48, of the detent pin 38 and a stop plug 50 fixed in the barrel 36. The detent pin 38 may be selectively withdrawn from engagement with a stop key 24 by pulling on a control line 52 secured to the pin. Pulling of the line 52 functions to retract the detent pin 38 into the barrel and permits free rotation of the shank 16 about the cylindrical fluke shaft 12, as illustrated by the shank shown in phantom in FIG. 3. Since the coil spring 46 is not connected to the main anchor line, the compression forces developed need only be sufficient to maintain the detent pin 38 in an engaged state and sufficient to prevent accidental disengagement by normal operating tensions placed on the control line 52 during use. Additionally, as all lateral forces between the anchor shank 16 and the cylindrical fluke shaft 12 in the longitudinal direction of the shaft are imparted to the plurality of keys and to the collar, the detent pin 38 will not tend to bind in an engaged position restricting easy release. The pulling force on the control line 52 is thereby reduced, hence reducing the necessary tensile strength required in the line.

The control line 52 is attached to a small ring 54 at the top 48 of the detent pin 38 as illustrated in FIGS. 2 and 3. From its attachment to the ring 54, the control line 52 threads up through a hole in the stop plug 50 (FIG. 3) and out the distal end of the anchor shank 16. Once the pin 38 is disengaged from the principal stop key, designated 24a (FIG. 3), for the anchoring position, the shank 16 may be rotated approximately one quarter turn. In the latter position, the detent pin may be engaged with the stop key therebeneath to secure the flukes in a position substantially parallel with the shank 16. With the shank so positioned, an embedded anchor may be easily withdrawn as the pulling force along the anchor line 14 becomes directed along the longitudinal aixs of the embedded flukes as shown by the phantom position of the shank 16 in FIG. 1.

In addition to the releasable fluke feature, the detent pin 38 may alternately lock the anchor shank 16 in one of two storage positions. Considering FIG. 3, when the anchor shank is rotated 90° in either direction such that the detent pin 38 engages stop key 24b or c, the anchor achieves a compact collapsed position. This compact position is ideal for storage of the anchor flat against a wall or the ground. Rotation of the anchor shank 16 to a position 180° removed from the anchoring position shown in FIG. 3, such that the detent pin 38 engages stop key 24d, permits the anchor to be stored with the shank 16 upright and the flukes 10 curving downward to provide a stable stance for the anchor. In the latter position, each fluke 10 forms a support leg, rather than a rocker, providing an ideal position for the temporary storage of the anchor.

The modified embodiment of the release mechanism shown in FIG. 5 incorporates the same principles as that employed in the principal embodiment. In the modified embodiment the detent pin 38' is not grooved. Rather than a groove engaging a single stop key, the detent pin locks in position between two adjacent stop keys, designated 24'. In all other respects, structurally and operationally, the anchor containing the modified embodiment is identical to that disclosed in the principal embodiment.

I claim:

1. An anchor having releasable flukes, said anchor comprising:
   (a) an elongated anchor shank;
   (b) a fluke shaft having a centrally located cylindrical portion;
   (c) a plurality of flukes fixed to said fluke shaft;
   (d) a plurality of protruding stop keys fixed around the circumference of the centrally located cylindrical portion of said fluke shaft;
   (e) a yoke-like collar having two interconnected annular rings, said rings being connected to said anchor shank and disposed, respectively, to each side of the plurality of stop keys in encompassing relationship to said fluke shaft for rotational movement relative thereto;
   (f) a detent pin engageable with said stop keys for locking said anchor shank in relation to said fluke shaft, and
   (g) release means connected to said detent pin for selectively releasing said detent pin from locked engagement with said stop keys.

2. The combination of claim 1 wherein the detent pin has a grooved end for retractable engagement with an individual stop key.

3. The combination of claim 1 wherein the detent pin is shaped to nest between and in engagement with an adjacent pair of the stop keys to lock the anchor shank in relation to the fluke shaft.

4. The combination of claim 1 wherein:
   (a) the anchor shank is of tubular construction;
   (b) the detent pin is slidably received within the anchor shank;
   (c) a compression spring is received in the anchor shank to normally urge the detent pin toward the fluke shaft and into engagement with the stop keys, and
   (d) a control line attached to the detent pin for withdrawing the pin into the shank and away from the fluke shaft.

5. An anchor having releasable flukes which may be locked in two distinct storage positions, said anchor comprising:
   (a) an elongated anchor shank;

(b) a fluke shaft having a centrally located cylindrical portion;

(c) a pair of diametrically mounted flukes fixed adjacent to each end of said fluke shaft in such a manner that the flukes in each of the two pairs are slightly curved upward toward the elongated anchor shank when shank is locked in an anchoring position relative to said flukes;

(d) a plurality of stop keys fixed around the circumference of the centrally located cylindrical portion of said fluke shaft, wherein the location of said stop keys determines a plurality of defined stop positions;

(e) a yoke-like collar having two interconnected annular rings, said rings being connected to said anchor shank and disposed, respectively, to each side of the plurality of stop keys in encompassing relationship to said fluke shaft for rotational movement relative thereto;

(f) a detent pin engageable with said stop keps for locking said anchor shank in relation to said fluke shaft in an anchoring position or in either:

(1) an upright storage position rotated 180° from the anchoring position such that the flukes are curved downward opposite the direction of the anchor shank, or (2) a folded storage position rotated 90° from the anchoring position, and (g) release means connected to said detent pin for selectively releasing said detent pin from locked engagement with said stop keys.

References Cited

UNITED STATES PATENTS

| | | | |
|---|---|---|---|
| 2,797,658 | 7/1957 | Doty | 114—208 |
| 2,914,015 | 11/1959 | Farr | 114—208 |

TRYGVE M. BLIX, Primary Examiner